(12) United States Patent
Molin

(10) Patent No.: US 7,150,621 B2
(45) Date of Patent: Dec. 19, 2006

(54) CASTING INSTALLATION THAT IS INTENDED, IN PARTICULAR FOR THE PRODUCTION OF ELECTRODES AND THE METHOD USED IN ONE SUCH INSTALLATION

(75) Inventor: Andre Molin, Givors Cedex (FR)

(73) Assignee: Solios Carbone, Givors (FR)

( * ) Notice: Subject to any disclaimer, the term of this patent is extended or adjusted under 35 U.S.C. 154(b) by 72 days.

(21) Appl. No.: 10/486,594

(22) PCT Filed: Aug. 12, 2002

(86) PCT No.: PCT/FR02/02858

§ 371 (c)(1),
(2), (4) Date: Aug. 2, 2004

(87) PCT Pub. No.: WO03/016009

PCT Pub. Date: Feb. 27, 2003

(65) Prior Publication Data

US 2005/0012236 A1 Jan. 20, 2005

(30) Foreign Application Priority Data

Aug. 16, 2001 (FR) .................................. 01 10862

(51) Int. Cl.
*B28B 3/00* (2006.01)

(52) U.S. Cl. ...................... 425/261; 425/255; 425/259; 425/260; 425/432; 264/37; 264/109; 264/37.29

(58) Field of Classification Search ................ 425/259, 425/260, 261, 255, 432; 264/37, 109, 37.29
See application file for complete search history.

(56) References Cited

U.S. PATENT DOCUMENTS

| 2,859,502 A | | 11/1958 | Brown, Jr. | |
| 3,677,674 A | * | 7/1972 | Bowles | .................... 425/78 |
| 5,054,652 A | * | 10/1991 | Oshima et al. | ................ 222/1 |

FOREIGN PATENT DOCUMENTS

DE 4415177 A1 * 11/1995

OTHER PUBLICATIONS

Translation of Guenther patent DE 4415177 A1.*

* cited by examiner

*Primary Examiner*—Joseph S. Del Sole
*Assistant Examiner*—Maria Veronica Ewald
(74) *Attorney, Agent, or Firm*—Egbert Law Offices

(57) ABSTRACT

A moulding plant, notably intended for the production of electrodes, includes a hopper, at least a first mould and a second mould, two compression devices, each device including a working table and a pressing form. The plant is characterized in that there is fixed intermediate laying plane, interspaced between the compression devices, and vertical to the hopper, and there is a displacement device to position each either at a working table, or at the intermediate laying plane.

5 Claims, 12 Drawing Sheets

CASTING INSTALLATION THAT IS INTENDED, IN PARTICULAR FOR THE PRODUCTION OF ELECTRODES AND THE METHOD USED IN ONE SUCH INSTALLATION

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

This invention concerns a moulding plant, notably intended for the production of electrodes, as well as a method implemented in such a plant.

However, although more especially intended for such applications, said moulding plant can also be used for the production of any other type of moulded product.

BACKGROUND OF THE INVENTION

In moulding plants, it is advantageous in some cases, when the paste which is cast into the mould shows a certain viscosity and/or granulometry, to perform compression operations in order to obtain the correct characteristics of the worked product and to proceed to or to perfect the implementation of said product. Currently, there are different types of plants known enabling, after filling the mould, to perform these compression operations.

To this end, a first type of plant known is composed of a paste feeder, a mobile hopper, two compression devices each comprising a table, whereon seats a mould, and a pressing form. The plant operates by moving tho mobile hopper, substantially horizontally, from a position where it is fed with paste and two paste unloading positions, positions wherein said hopper hangs over either of the moulds.

In this plant, it can be foreseen to work the product in a mould while the hopper is fed with paste or pours the paste into the second mould.

This type of plant exhibits various shortcomings, and notably this plant forces the displacement of an active member, i.e. the hopper, which provides notably the transfer link plant for flexible energies. Moreover, this type of plant calls for the creation of two drawing and ejection stations, i.e. a station per mould, which increases the cost of the plant.

A second type of plant known is composed of a paste feeder, two fixed weighing hoppers and two mobile compression devices comprising two mould support mobile vibrating tables.

This plant exhibits the same shortcoming as the previous one, i.e. it calls for the displacement of active members, in this instance the tables, which complicates the realization taking into account the magnitude of the mass displaced and of the active members displaced. Indeed, each table is moved between two positions corresponding to a filling position of the mould, said table being then vertical to its hopper, and a working position corresponding to a position of the table vertical to the pressing form. Such a plant also exhibits the shortcoming of using two hoppers, which increases the price of the plant accordingly.

Finally, a third type of plant known provides a plant composed of a paste feeder, a fixed hopper, three moulds, and of a compression device, as well as a carrousel enabling the displacement of the moulds successively under the hopper, then at the compression device, then again at a drawing zone.

This plant requires however the production and the installation of the carrousel, it also requires the use of three moulds.

BRIEF SUMMARY OF THE INVENTION

The purpose of the invention is to provide a moulding plant, notably intended for the production of electrodes, which remedies the shortcomings aforementioned and enables to provide a plant wherein no active member is moved.

Another purpose of this invention is to provide a moulding plant, notably intended for the production of electrodes, which enables the use of a single drawing and ejection station of the product.

Another purpose of this invention is to provide a moulding plant, notably intended for the production of electrodes, which enables easy access to each of the active members to facilitate the handling operations.

Another purpose of this invention is to provide a method implemented in the plant aforementioned which enables to obtain high throughput rate, and a preparation and/or drawing working in masked time.

Other purposes and advantages of this invention will appear during the following description which is given only for illustrative reasons and which does not intend to limit said invention.

According to the invention, the moulding plant, notably intended for the production of electrodes, comprises a hopper, at least a first mould and a second mould, two compression devices each comprising a working table and a pressing form, characterized in that said moulding plant comprises moreover:
  a fixed intermediate laying plane, interspaced between said compression devices, and vertical to said hopper, and
  displacement means to position each mould either at a working table, or at said laying plane.

The invention also concerns a method implemented in the plant as aforementioned, a method wherein the following steps are carried out for each mould:
  a mould filling step,
  a mould loading step on said corresponding working table,
  a working step, and
  a mould drawing step from said corresponding working table enabling to replace said mould vertical to said hopper.

BRIEF DESCRIPTION OF THE SEVERAL VIEWS OF THE DRAWINGS

It will be understood better when reading the following description, accompanied by the appended drawings which are part thereof

DETAILED DESCRIPTION OF THE INVENTION

Figure 1:
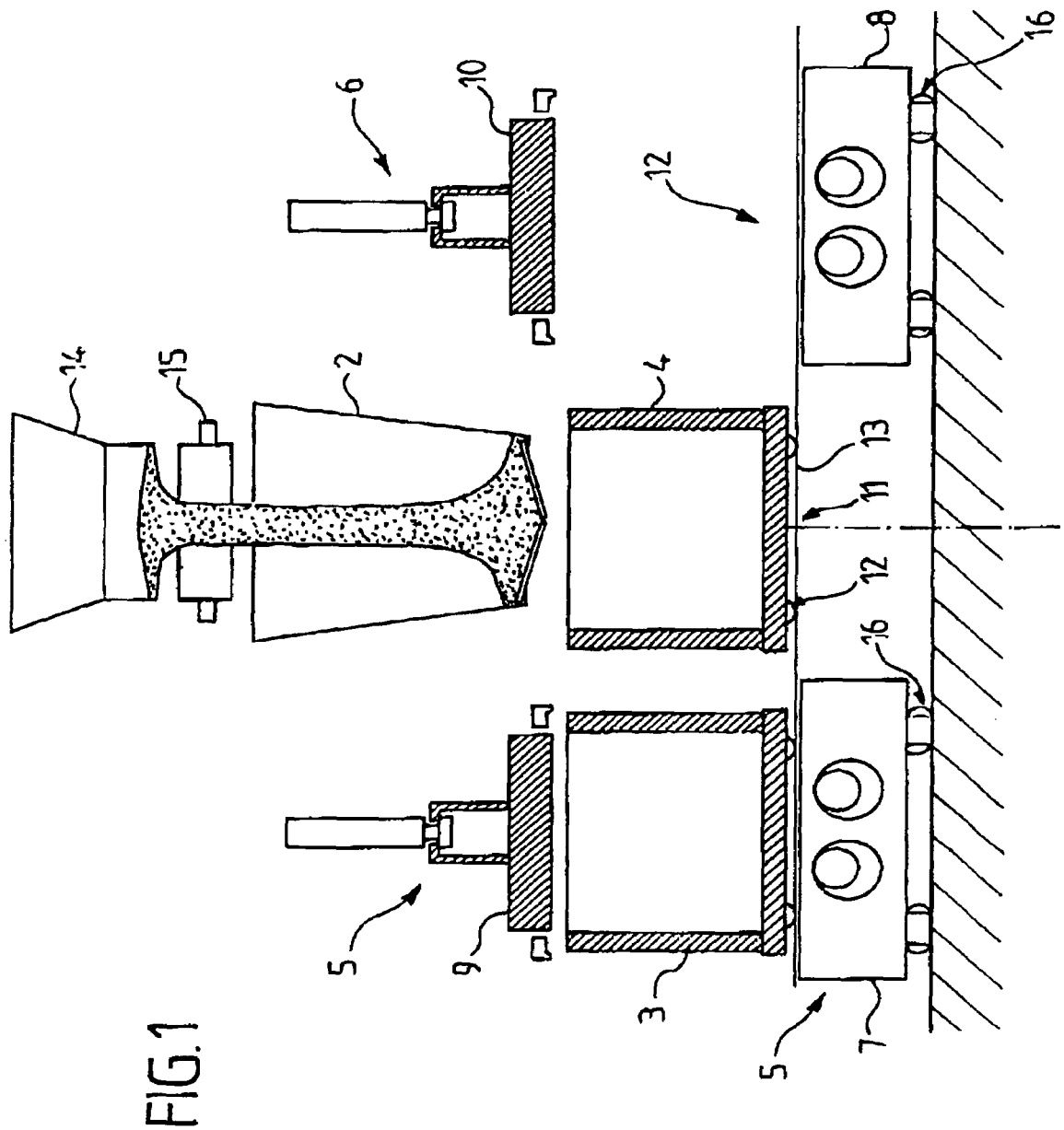
FIG. 1 illustrates, along a schematic sectional view, an embodiment of the plant according to the invention.

This invention relates to a moulding plant, notably intended for the production of electrodes.

As represented on FIGS. 1 to 11, the moulding plant, according to the invention, comprises a hopper 2, at least a first and a second moulds 4 and 3, two compression devices 6 and 5 each comprising a working table 8 and 7 and a pressing form 10 and 9.

According to the main characteristic of the invention, the moulding plant comprises, moreover:

a fixed laying plane 11, interspaced between said compression devices 6, 5, and vertical to said hopper 2, and displacement means 12 to position each mould 4, 3 either at a working table 8, 7, or at said laying plane 11.

Besides, according to the invention, said displacement means 12 position alternately each mould 3 and 4 at said laying plane.

Moreover, according to the invention, said displacement means 12 can be advantageously located at said working tables 7 and 8 and at the laying plane 11.

In the embodiment of FIGS. 1 to 11, said displacement means 12 are composed of rails 13 working together with rollers, not represented on the appended drawings. Said rails 13 are arranged at the tables 7, 8 and at the laying plane 11 substantially parallel to the displacement direction of said moulds 3 and 4. The moulds are driven preferably by a chain and a hydraulic motor.

However, according to other embodiments, said displacement means 12 can be composed of any device known to the man of the art in the field of conveying and notably the field of conveying products in assembly lines, for example it may be electrically operated rolls and capable of revolving round their axes in both directions in relation to the requested displacement direction of each mould.

Said moulding plant comprises besides drawing and ejection means, not represented on the appended drawings, which enable to draw and eject the product from the mould 3 or 4 at said laying plane 11.

To this end, said evacuation means can be placed advantageously at the portion of said intermediate laying plane 11 vertical to said hopper 2 or, in a variation, at said intermediate laying plane 11 but in an offset fashion with respect to said hopper 2 in the ejection direction of the product.

According to the invention, said hopper 2 which enables to fill the moulds 3 and 4 with paste, is preferably fixed and composed of a weighing hopper.

Said hopper 2 is fed itself using a paste feeder 14, via a distributor 15, according to known techniques.

According to the invention, said working tables 7 and 8 are preferably fixed and composed of vibrating tables. This type of table enables to improve the compression and the shaping of the paste while suppressing the free spaces existing in the paste contained in the mould and which may notably be due to bad distribution of the paste when filling said mould, or still to the granulometry and/or viscosity of the paste.

According to the invention, by intermediate laying plane 11 is meant any type of device capable of supporting a mould, it may be notably a device for supporting the rails 13 or for example a table or similar.

The invention also concerns a method implemented in the moulding plant as aforementioned. Said process, notably intended for the production of electrodes, is a method wherein, as illustrated on FIG. 12, the following steps are performed for each mould:

a filling step RM1, RM2 of the mould 4, 3, a loading step CV1, CV2 of the mould 4, 3 on said corresponding working table 8, 7, a working step FM1, FM2, and an unloading step DV1, DV2 of the mould 4, 3 from said corresponding working table 8, 7 which enables to place said mould 4, 3 vertical to said hopper 2.

Besides, according to the invention, it is provided a drawing and ejection step DM1, DM2 at the intermediate laying plane 11 after respectively the unloading steps DV1, DV2 of the mould 4, 3.

With reference to FIGS. 2 to 11, one can see, for each mould, the different formation steps of the product.

FIG. 1 illustrates the feeding phase of said hopper 2 which is being filled with paste. At that stage, during the initialization phase, both moulds 3 and 4 are empty, one of the moulds being on its working table 7, and the other at said laying plane 11 vertical to said hopper 2. However, during the cycle, the mould situated on the working table is being formed as the mould situated at the laying plane 11 is placed vertical to said hopper 2 after ejection of the moulded product.

On the following Figures, one sees an embodiment in different configurations taken not at the beginning but during the cycle, whereas both moulds are not empty.

Figure 2:
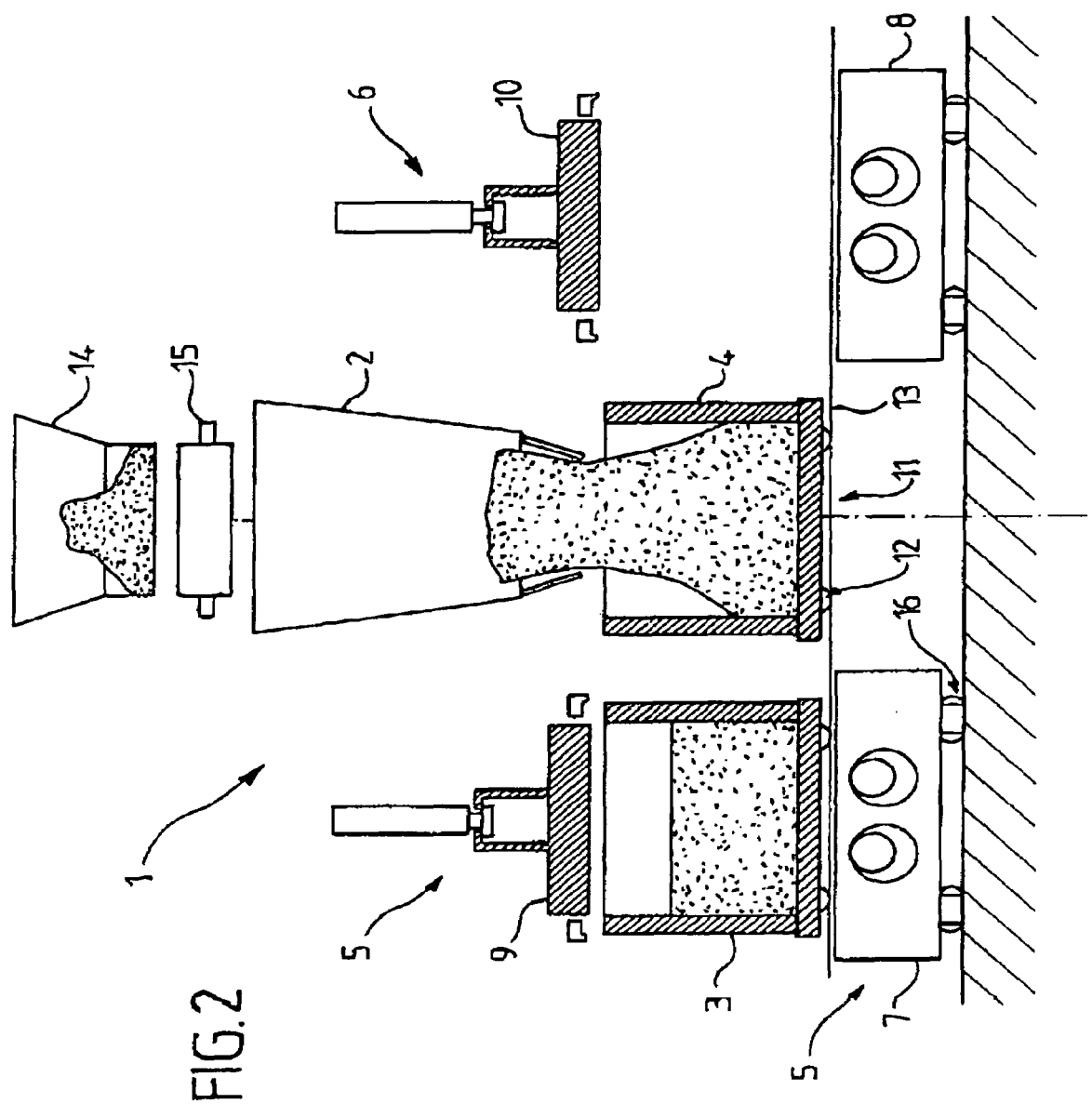
FIGS. 2 to 11 show sequential elevational views of the embodiment of FIG. 1 in different configurations enabling the invention to build the product, to draw it from the mould and to eject it.

On FIG. 2 and while taking as a reference the mould 4, as the first mould, and the mould 3, as the second mould, one can see the unloading of the paste contained in said hopper 2 in said first mould.

Figure 3:
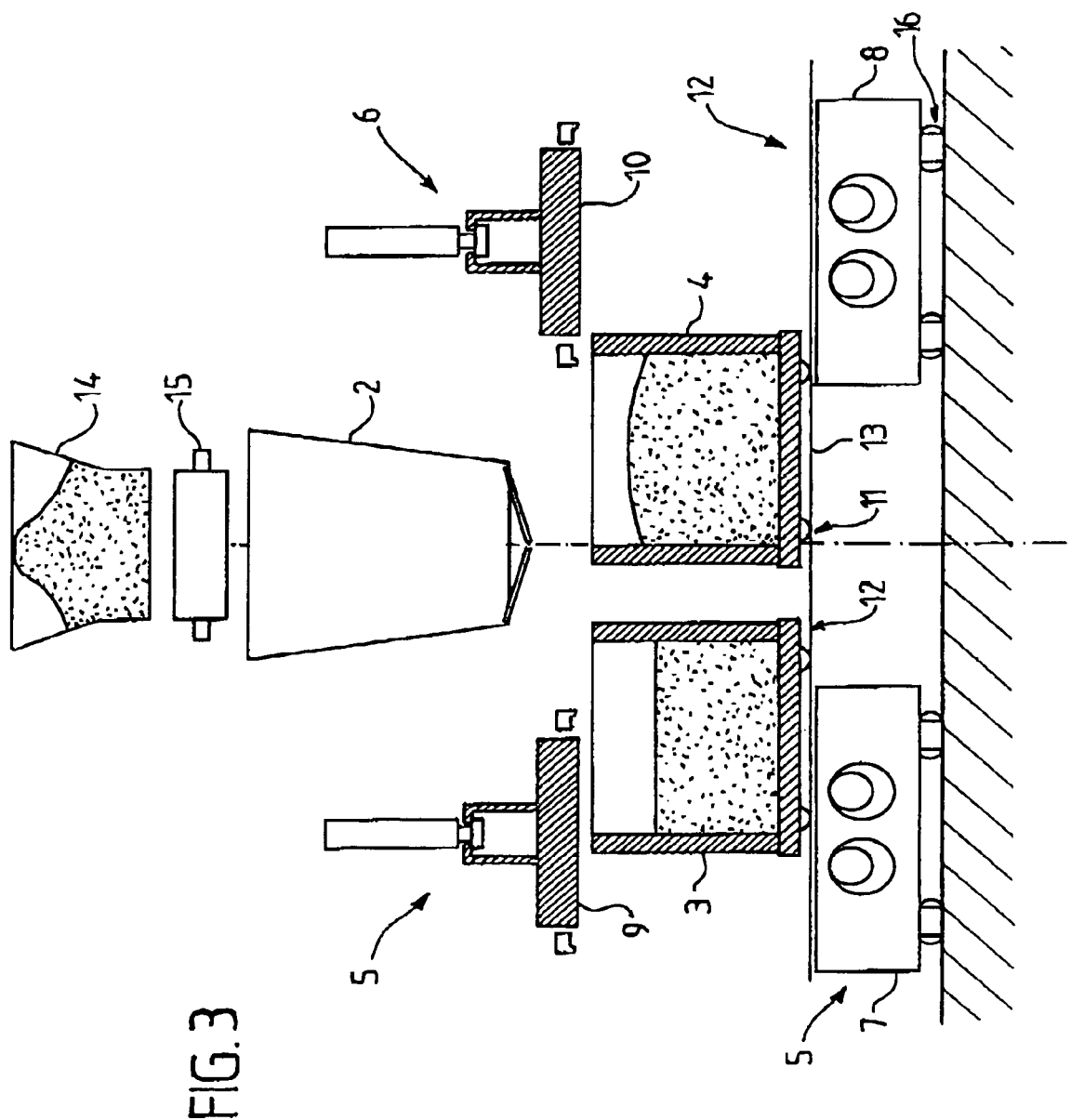

FIG. 3 represents the loading phase, notably by translation, from the first mould 4 onto said corresponding working table 8. In this figure, one also sees that the second mould 3 is unloaded, notably by translation, simultaneous or not, of said working table 7 and will be placed at said laying plane 11.

In the embodiment of FIGS. 1 to 11, the loading step CV1 of the first mould 4 onto said corresponding working table 8 is performed simultaneously to the unloading step CV2 of the second mould 3 and reciprocally. The definition to be given to the word <<simultaneously>> in such case is that the loading and unloading steps can be performed either simultaneously or with an offset with respect to one another with a time-related overlapping portion of both these steps.

Consequently, according to another embodiment of the invention, the loading and unloading steps of the first and second moulds can be dissociated over the course of time.

Figure 4:
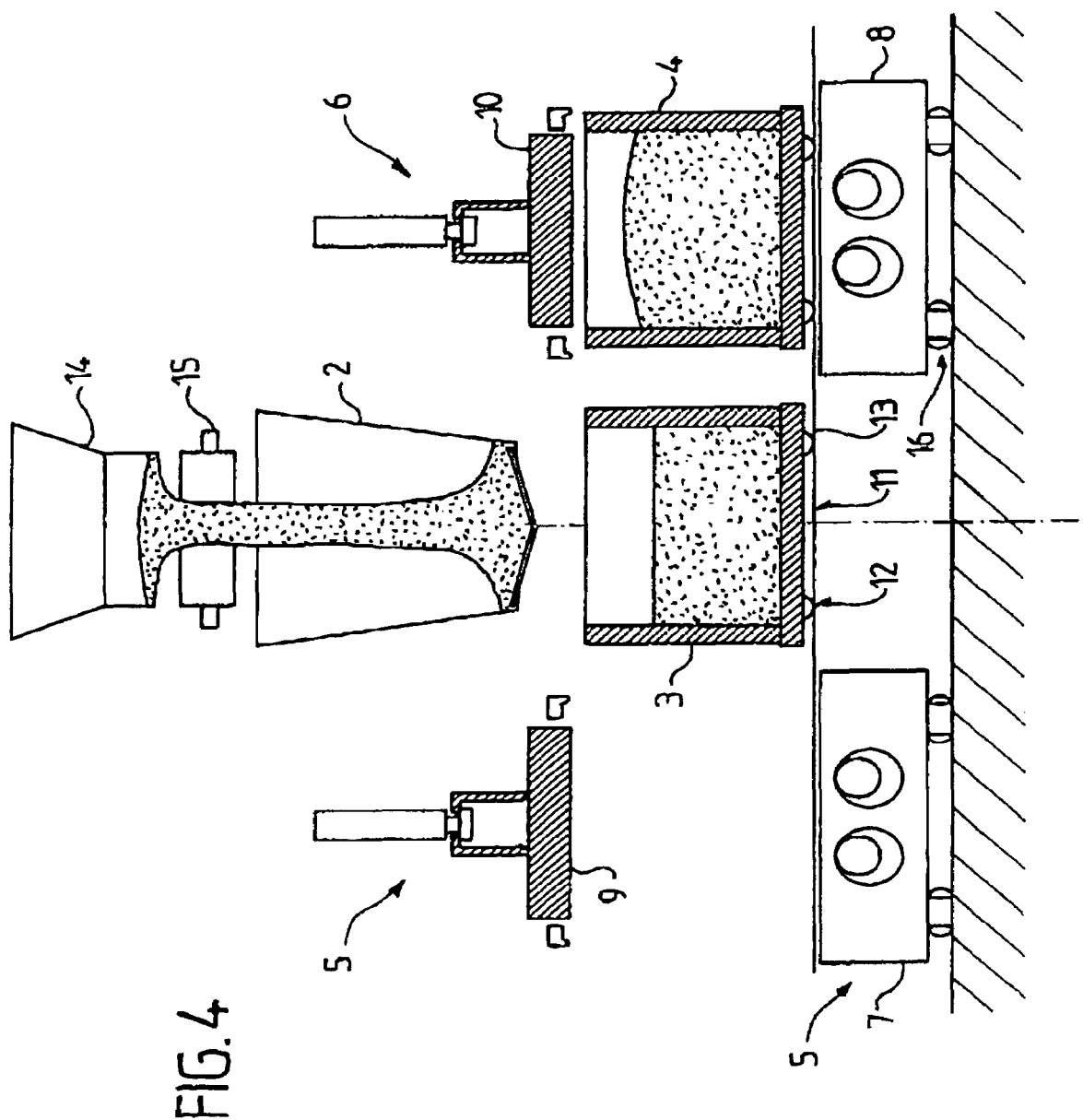

With reference to FIG. 4, one sees the loading step CV1 of the first mould 4 onto said working table 8.

Figure 5:
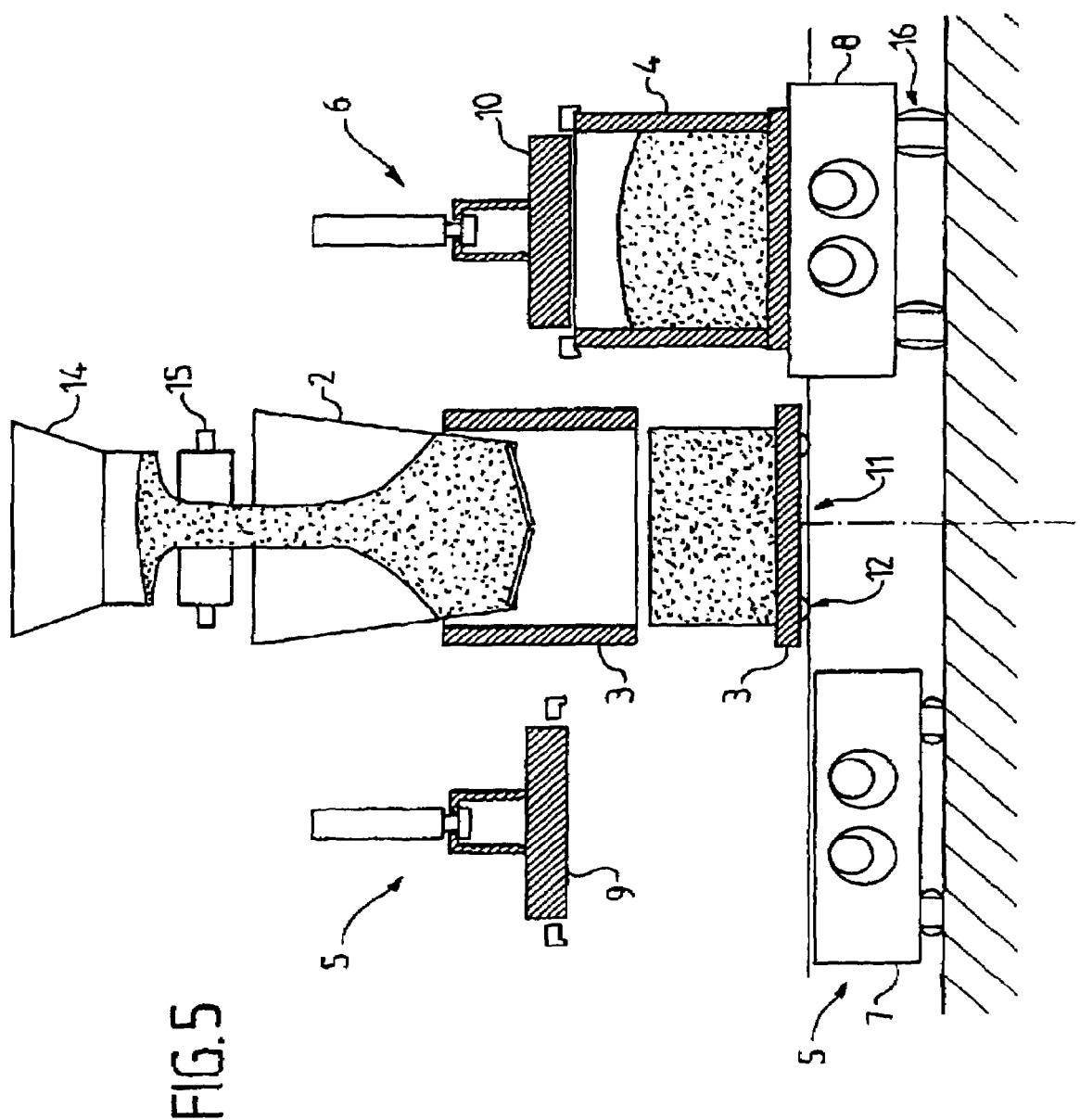

With reference to FIG. 5, one sees that the product contained in the second mould is drawn at said laying plane 11. Besides, one sees that lifting means 16 are provided at the working table 8. These lifting means 16 raise said table 8 and said first mould 4 and thus enable to free said first mould from the displacement means 12, they are composed preferably of inflatable members enabling moreover to absorb the vibrations created at said working table 8. These lifting means 16 also equip said working table 7. Consequently, it is possible to use other types of lifting device known to the man of the art, whereas the lifting and shock-absorbing functions can obviously be dissociated over the course of time.

One sees thus on FIG. 5 that said lifting means 16 have raised said first mould 4 and that the shaping of the product begins. To this end, the compression device 6 is put into service causing on the one hand the actuation of the vibrating table 8 and on the other hand the actuation of the pressing form 10.

At that level, said hopper 2 is in feeding phase. This feeding phase may start as soon as the previous unloading phase of said hopper 2 is ended, which enables to conciliate the possibility of feeding the hopper from a feeder operating continuously, and to mould the products according to a discontinuous process.

Figure 6:
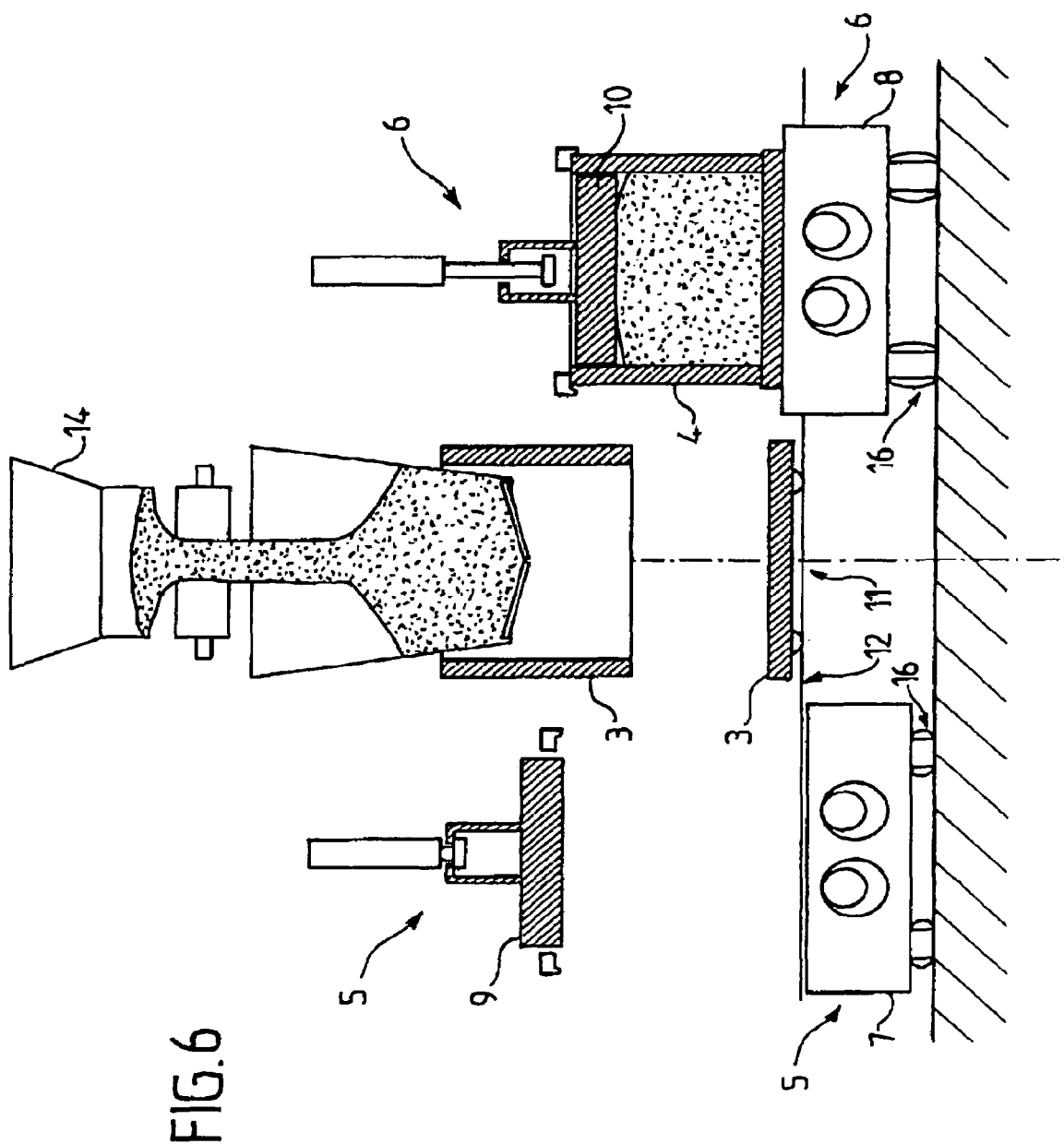

This FIG. 6 represents the end of the ejection phase DM2 of the product while placing the second mould vertically to the hopper 2. One also sees that the working step continues at the first mould.

Figure 7:
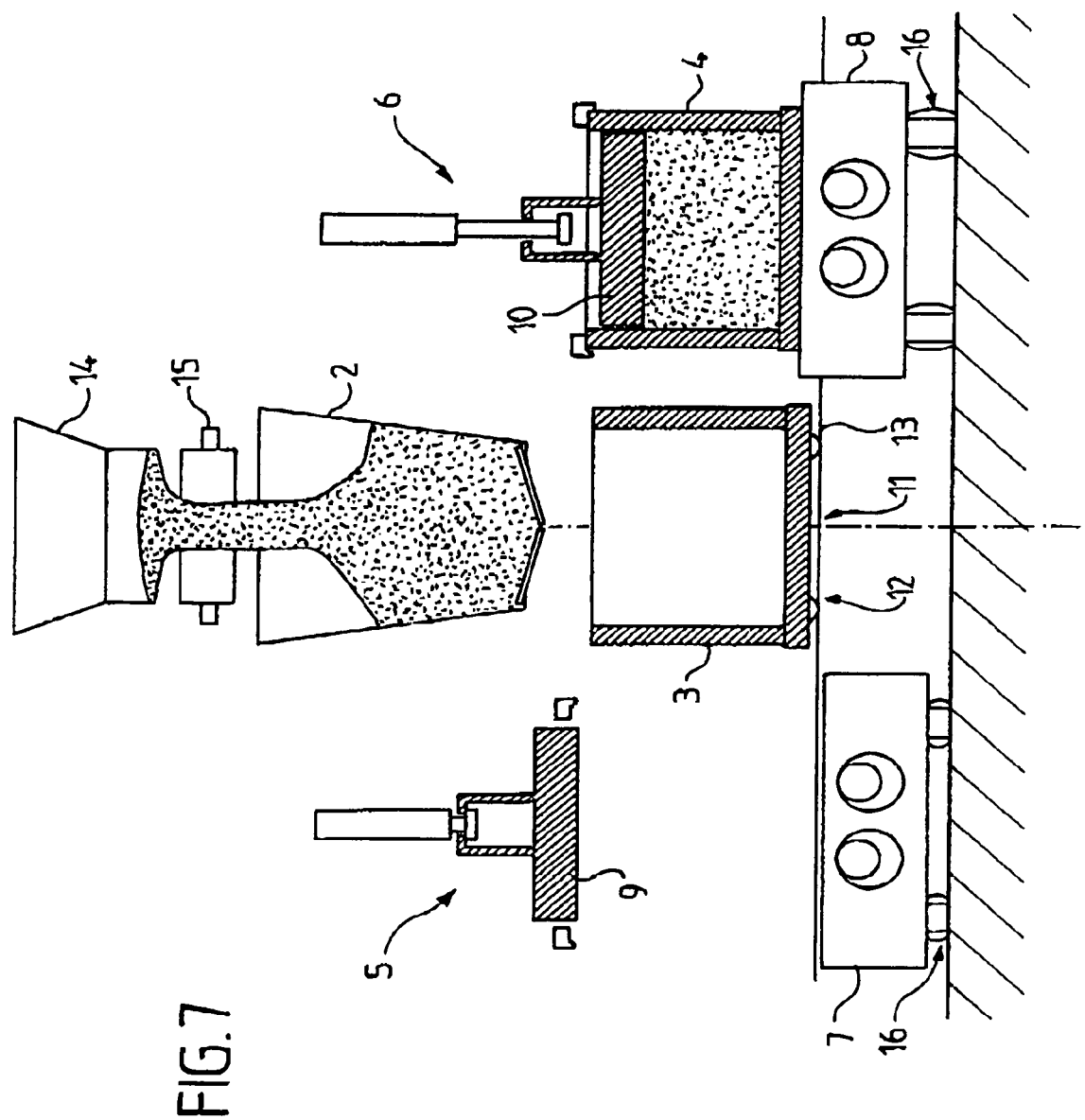

FIG. 7 represents a feeding phase (AT) of the hopper 2.

Figure 8:
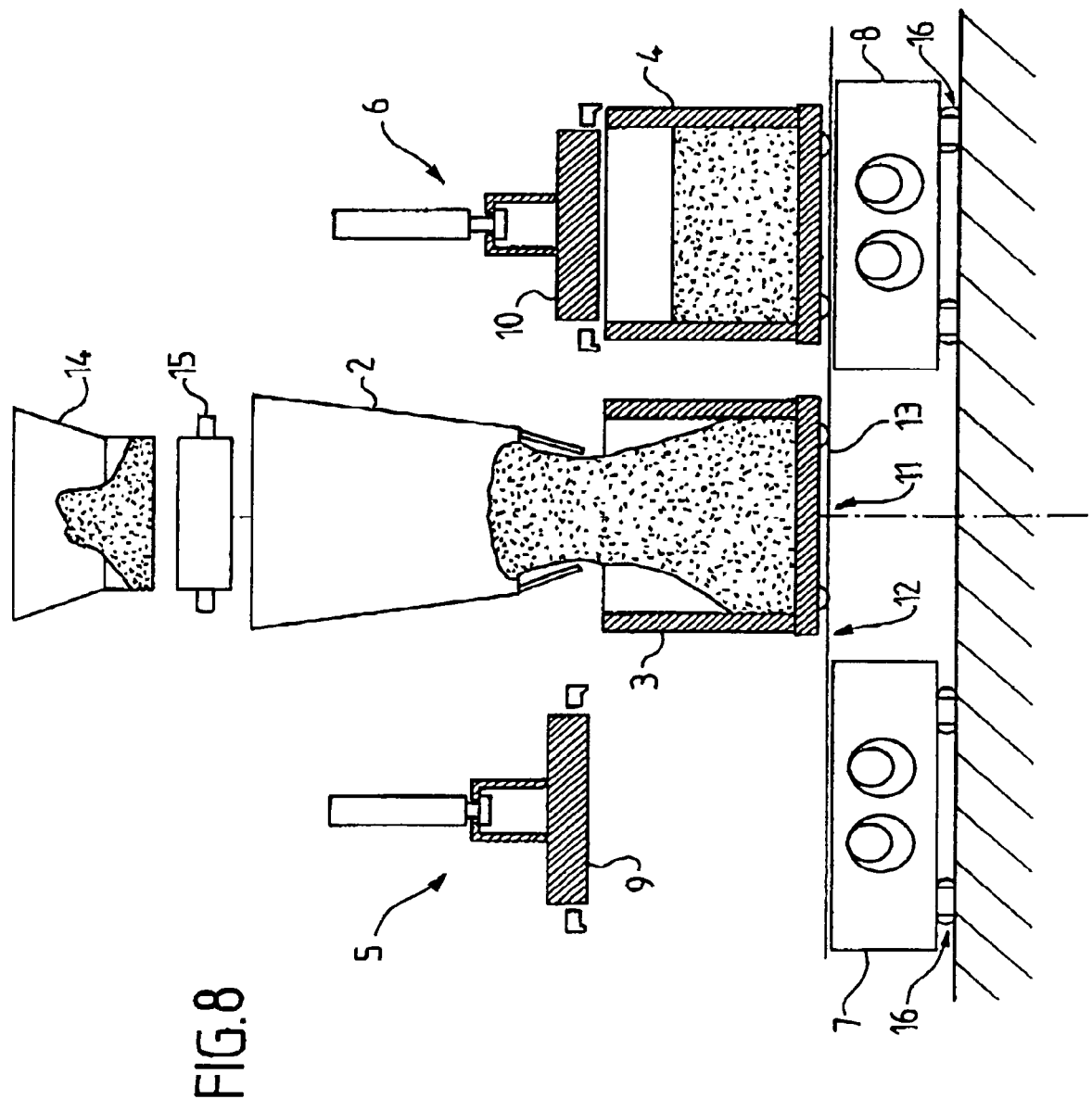

FIG. 8 represents the filling step RM2 of the second mould 3, one can notice that during this step, the lifting means 16 position said first mould 4 at the displacement means 12 in order to enable to move another time.

Figure 9:
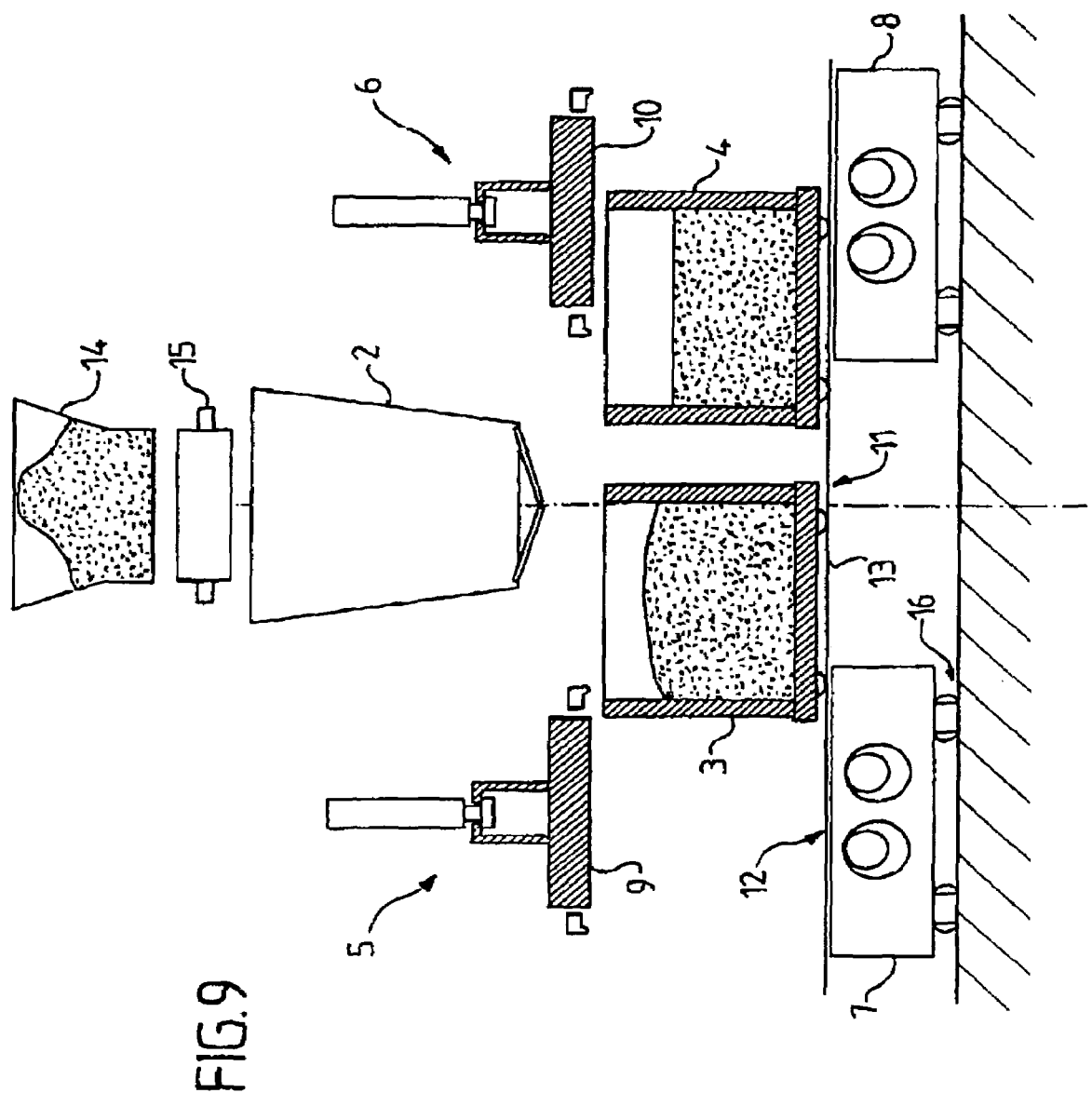
Figure 10:
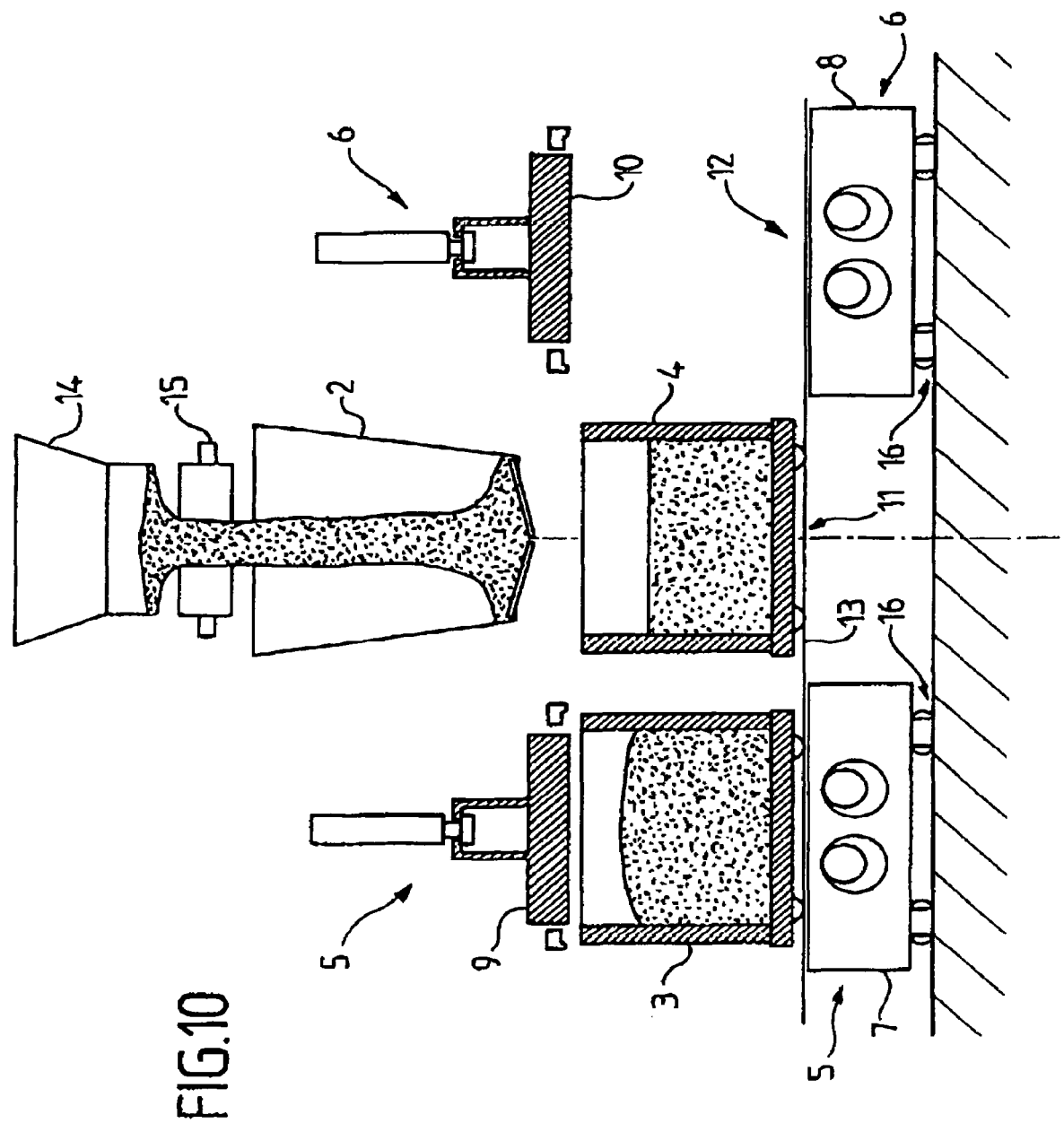

FIGS. 9 and 10 represent the loading step CV2, notably by translation, of the second mould 3 onto said working table 7, and simultaneously the unloading step DV1, notably by translation, of the first mould 4 from said working table 8.

Figure 11:
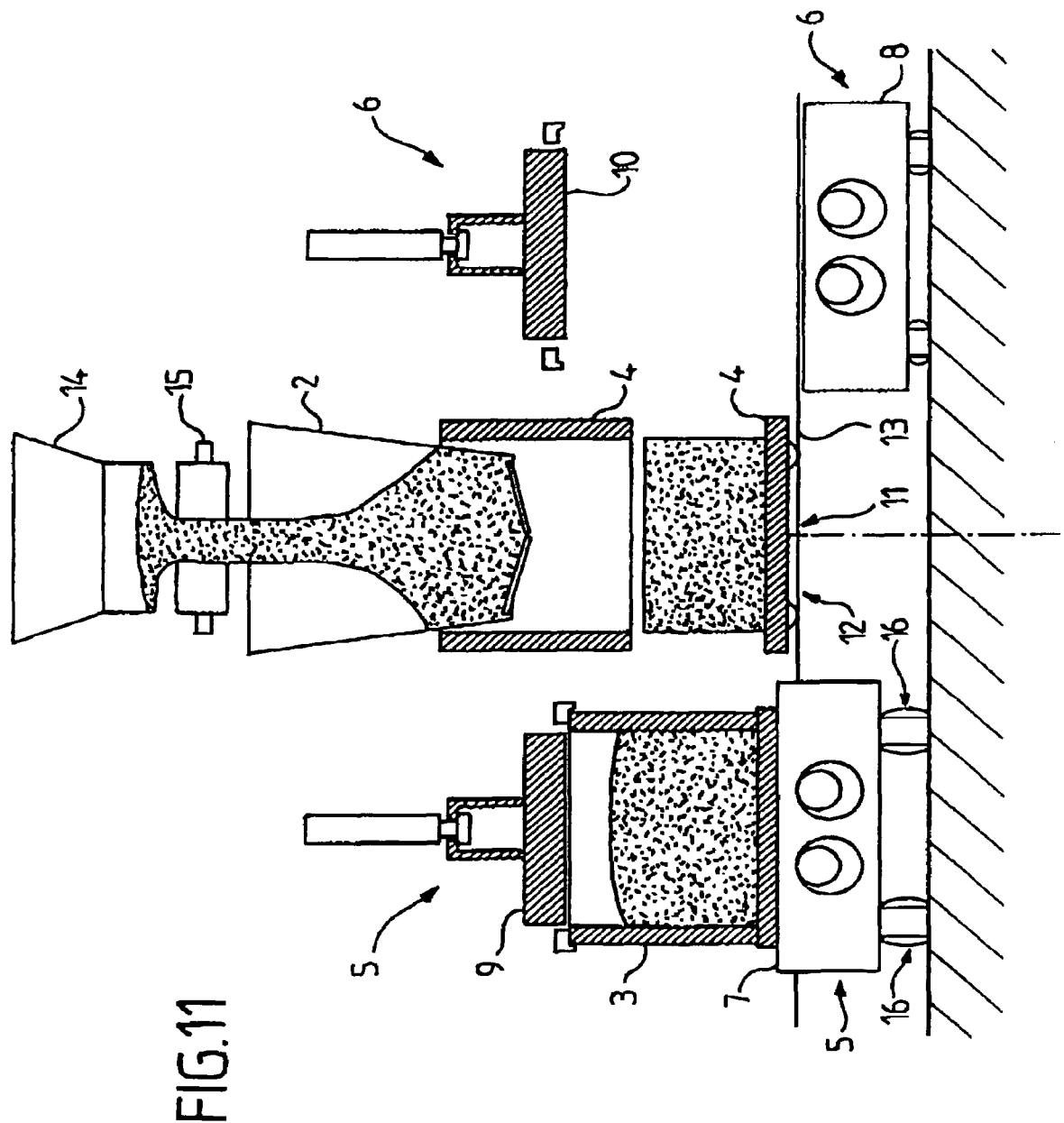

FIG. 11 represents the drawing and ejection steps DM1 of the product out of the first mould 4, at said laying plane 11. According to the embodiment of FIGS. 5, 6 and 11, the lateral walls of the moulds are detached from the bottom wall thanks to said drawing means thus enabling to free the product.

Said ejection means then enable to move said product along the intermediate laying plane 1. The lateral walls of the mould are then replaced at the bottom wall of said mould so that said mould can again be filled with paste and starts a new moulding cycle. During this drawing and ejection step, realized after said unloading step of the mould, the working step FM2 continues for the second mould or possibly the positioning step of said second mould at the displacement means 12.

Figure 12:
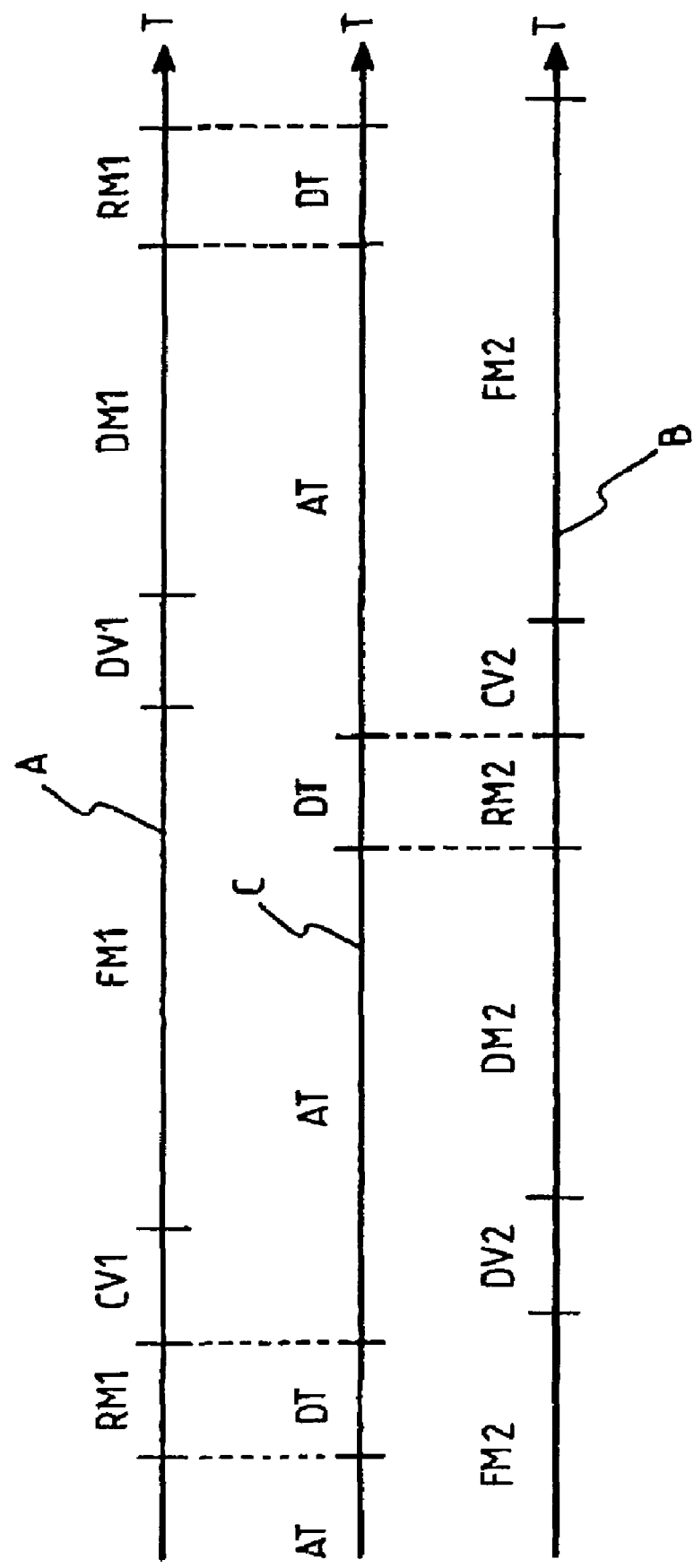
FIG. 12 is an elevational view of a chronological sequence representing an embodiment of the various steps according to the method.

FIG. 12 illustrates an example, without limitation thereto, of successive moulding cycles of the first and second moulds as well as of the feeding and unloading cycle of said hopper 2. On the channel A, one can then follow the different moulding steps an the first mould 4, on the channel B, the different moulding steps for the second mould 3, and on the channel C, the different feeding and unloading steps of the hopper 2.

One sees thus that the drawing step DM1 of the first mould 4 is, for example, realized, at least partially, during the working step for the second mould 3, and reciprocally. One also sees that the filling step of the first mould 4 is realized at least partially, during the working step for the second mould 3 and reciprocally.

It should also be noted that the feeding step of the hopper (AT), provided between two unloading steps of the hopper (DT) is such that the supply from the hopper can be continuous or discontinuous and fill either partially, or totally, the time space between said successive unloading steps of the hopper 2.

The working step at the first and second moulds can be realized, preferably, with a delay equal to or greater than the total delay of the other steps.

The invention concerns moreover the product realized from the process as aforementioned. Said product being notably a constitutive element of an electrode and more particularly a carbon anode, but can also be any other moulded product realized from the process as aforementioned.

Naturally, other embodiments, obvious to the man of the art, could have been contemplated without departing from the framework of the invention defined by the claims hereunder.

The invetion claimed is:

1. A molding plant for production of electrodes comprising:
   a hopper means for selectively dispensing a material therefrom;
   a first mold having a side wall and a bottom wall;
   a second mold having a side wall and a bottom wall;
   a first compressing means having a working table and a pressing form, said first compressing means for compressing the material dispensed from said hopper means into said first mold with said pressing form;
   a second compressing means having a working table and a pressing form, said second compressing means for compressing the material dispensed from said hopper means into said second mold with said pressing form;
   a fixed intermediate laying plane extending between said first and second compressing means, said fixed intermediate laying plane positioned below said hopper means and extending transverse to a dispensing axis of said hopper means;
   a displacing means cooperative with said first and second molds for positioning said first mold at either said working table of said first compressing means or below said hopper means on said fixed intermediate laying plane and for positioning said second mold at either said working table at said second compressing means or below said hopper means on said fixed intermediate laying plane; and
   an evacuating means cooperative with said first and second molds at said hopper means for drawing and ejecting the compressed material from said first and second molds in an area directly below said hopper means at said fixed intermediate laying plane, said evacuating means for selectively detaching the side wall from the bottom wall of each of said first and second molds.

2. The molding plant of claim 1, said displacing means for positioning said first and second molds alternately below said hopper means on said fixed intermediate laying plane.

3. The molding plant of claim 1, said working tables being at a fixed position, said working tables being vibrating tables.

4. The molding plant of claim 1, said hopper means being a fixed weighing hopper.

5. The molding plant of claim 1, further comprising:
   a lifting means cooperative with each of said working tables for freeing said working tables from said displacing means.

* * * * *